July 20, 1965  R. M. AUGUSTIN, JR., ETAL  3,195,431
PHOTOGRAPHIC ACCESSORY

Filed Aug. 8, 1961  3 Sheets-Sheet 1

Rolf M. Augustin, Jr.
and
Vaito K. Eloranta
INVENTORS

BY
Brown and Mikulka
ATTORNEYS

July 20, 1965   R. M. AUGUSTIN, JR., ETAL   3,195,431
PHOTOGRAPHIC ACCESSORY
Filed Aug. 8, 1961   3 Sheets-Sheet 2

INVENTORS
Rolf M. Augustin, Jr.
Vaito K. Eloranta
BY
Brown and Mikulka
ATTORNEYS July 20, 1965   R. M. AUGUSTIN, JR., ETAL   3,195,431
PHOTOGRAPHIC ACCESSORY
Filed Aug. 8, 1961   3 Sheets-Sheet 3
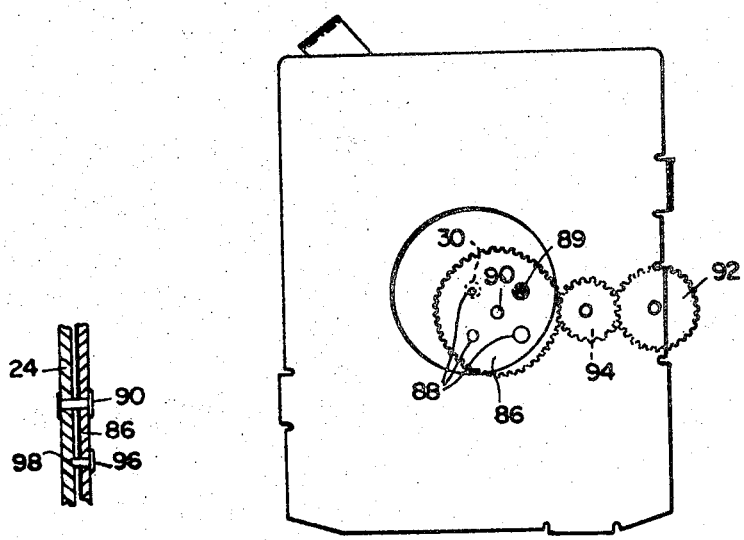
FIG. 4a
FIG. 4
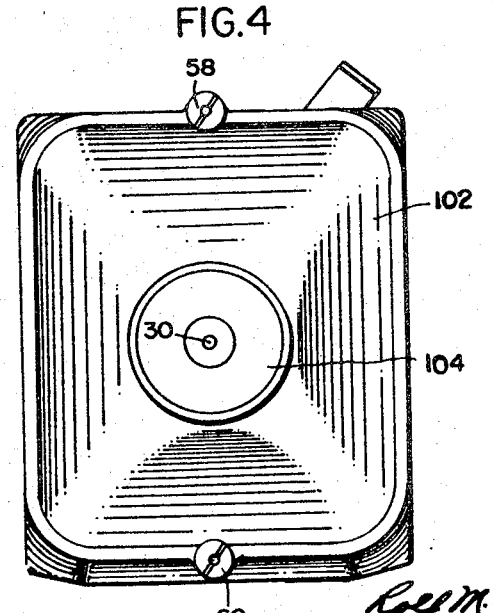
FIG. 5
Rolf M. Augustin, Jr.
Vaito K. Eloranta
INVENTORS
BY
Brown and Mikulka
ATTORNEYS

United States Patent Office

3,195,431
Patented July 20, 1965

3,195,431
PHOTOGRAPHIC ACCESSORY
Rolf M. Augustin, Jr., Wellesley Hills, and Vaito K. Eloranta, Needham, Mass., assignors to Polaroid Corporation, Cambridge, Mass., a corporation of Delaware
Filed Aug. 8, 1961, Ser. No. 130,020
2 Claims. (Cl. 95—11)

This invention relates to photography and more specifically to accessories for use in conjunction with photographic cameras.

Conventional photographic cameras having lens systems with a minimum focusing distance of several feet may be adapted to take close-up exposures by attaching supplementary lenses designed to shorten the distance to the point of focus. The smallest aperture obtainable with many cameras will still be relatively large when the lens system is focused on a point only a few inches away. Consequently, when using supplementary lenses for taking close-up exposures, the depth of field is decreased so far as to be essentially flat, and points which are spaced from the focus point by only extremely small distances are out of focus. A reduction of the effective aperture of the lens system increases the depth of focus and minimizes aberrations, but additional illumination is usually required to supplement the ambient light in order to provide sufficient actinic radiation to traverse the lens system so as to provide proper exposure of the photosensitive film.

The present invention is concerned, in general, with novel apparatus useful in adapting a conventional camera to take close-up exposures.

Another object of the present invention is to provide means for mounting supplementary lenses to take close-up exposures while limiting the relative lens aperture to a comparatively small size and providing adequate illumination for proper photographic exposure.

A further object is to provide a camera attachment comprising means for mounting an optical element such as a close-up lens, means for holding the camera a proper distance from the object or scene to be photographed, and means for properly illuminating the object.

A still further object is to provide a camera attachment for taking close-up exposures which increases the depth of field provided by the normal aperture-defining means, illuminates the object to be photographed, and effectively eliminates glare from the object.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a rear elevational view of a modified embodiment of the apparatus of the invention;

FIG. 4a is a fragmentary, sectional side view of a portion of FIG. 4; and

FIG. 5 is a front view of the apparatus of FIG. 4.

Figure 1:
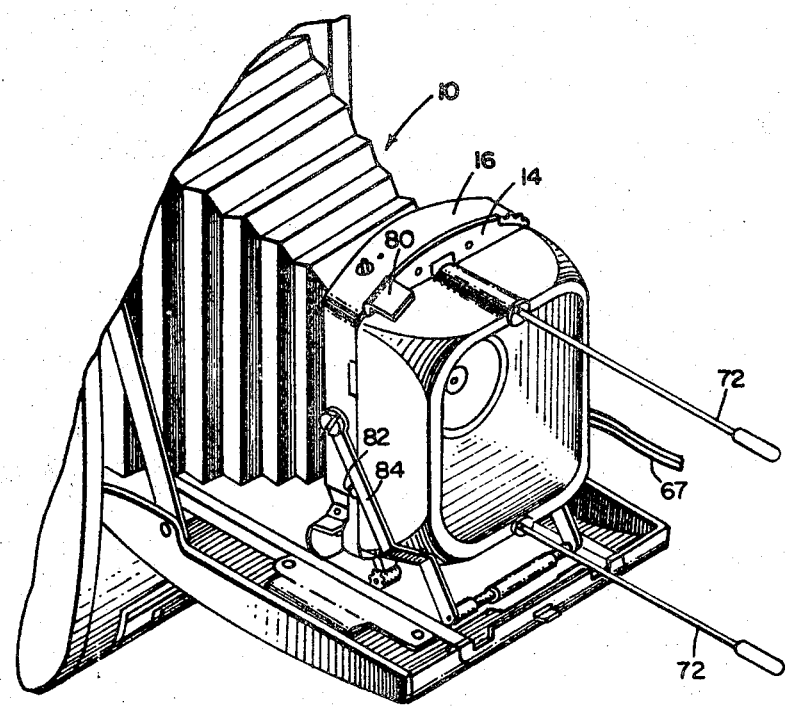
FIGURE 1 is a perspective view of a preferred embodiment of the present invention shown mounted on a photographic camera which is shown in fragment.
Figure 2:
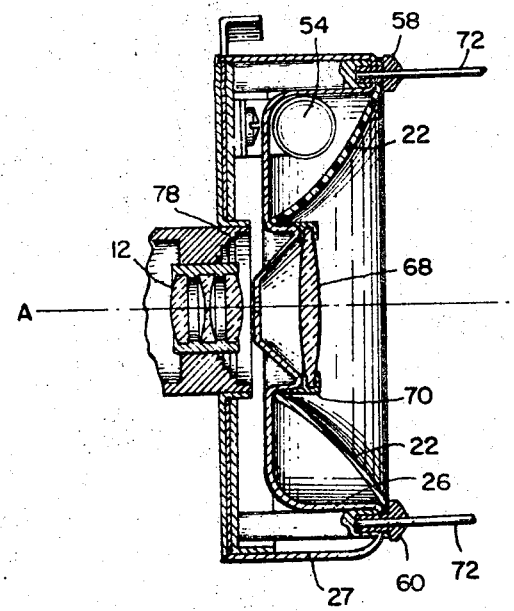
FIG. 2 is a side elevational view in vertical section through the center of the apparatus of FIG. 1, also showing a fragment of the camera.
Figure 3:
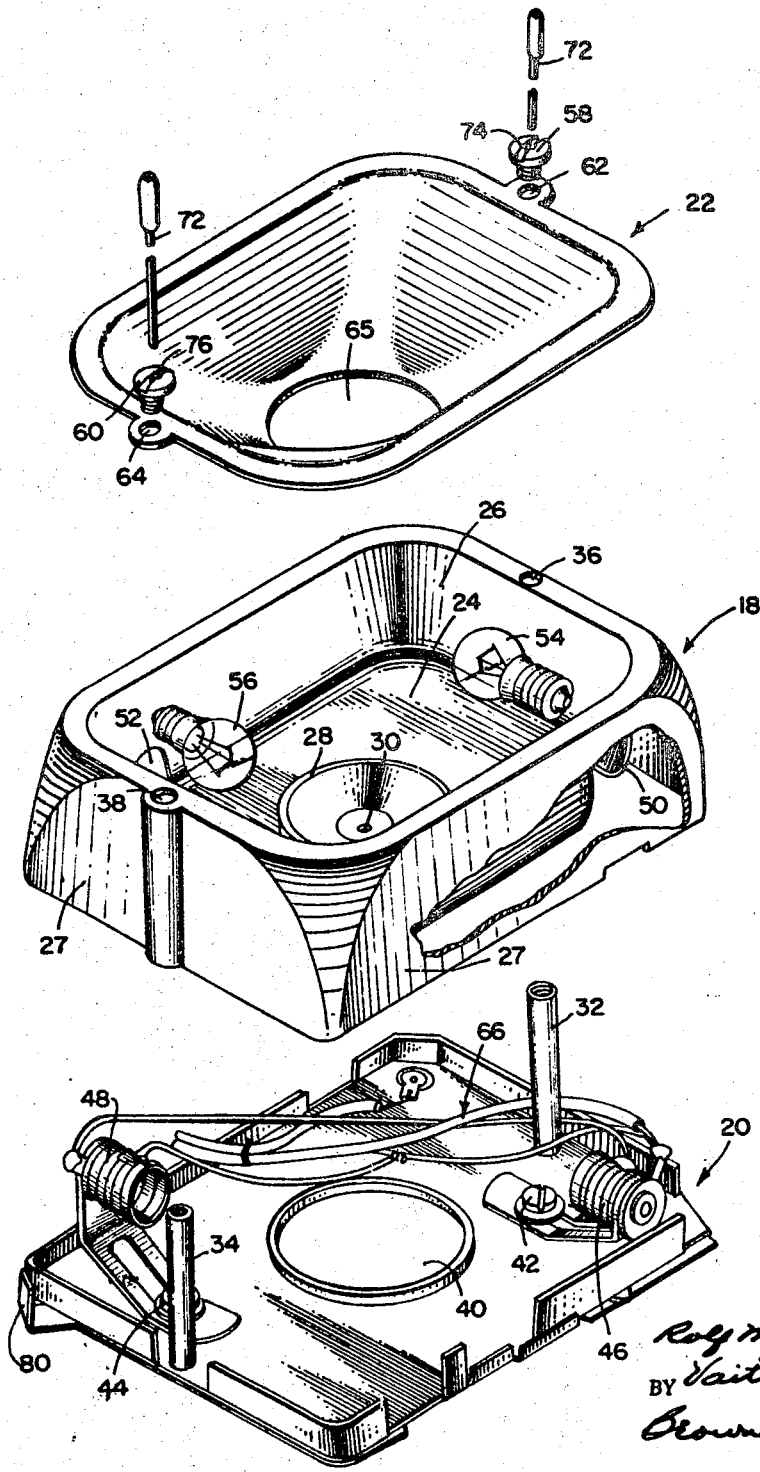
FIG. 3 is an enlarged, exploded perspective view of the apparatus of FIG. 1.

Referring now to the drawings, in FIGS. 1 and 2 is seen a fragment of a conventional photographic camera 10 having an objective lens system 12, having an optical axis A–A, and supported in known manner by lens board 14 which, in turn, is mounted on shutter housing 16 which contains a conventional photographic shutter (not shown). Objective lens system 12 may comprise any conventional optical lens system designed to be focused on points at distances of, for example, 3½ feet to infinity. In FIGS. 1 and 2, the apparatus of the present invention is shown mounted on a Polaroid Land camera, as exemplified in U.S. Patents Nos. 2,435,717 and 2,455,111, but is not intended to be restricted solely to use with cameras of this type.

The invention comprises a generally bowl-shaped first member 18, a base member 20 and a light-diffusing member 22. First member 18 includes bottom wall 24, internal side walls 26 extending outwardly therefrom, and external side walls 27. In a centrally disposed portion of bottom wall 24, circular flange 28 extends outwardly therefrom in the same direction as side walls 26. Fixed aperture 30 in bottom wall 24 is disposed substantially at the center of the area surrounded by circular flange 28. The portion of bottom wall 24 surrounding aperture 30, including circular flange 28, is preferably provided with a radiation-absorbing surface, such as a flat, black finish, and the remainder of the surface of bottom wall 24 and internal side walls 26 are provided with highly reflective surfaces, for reasons which will later become apparent. First member 18 is mounted on base member 20 by means of internally threaded posts 32 and 34 which extend into holes 36 and 38, respectively, extending through first member 18. Base member 20 has an opening 40 which is larger in diameter than fixed aperture 30 and in registration therewith when first member 18 is mounted on base member 20. Also mounted on base member 20 by any convenient means, such as soldering or by rivets or screws 42 and 44, are bulb receptacles 46 and 48. Side wall 26 of first member 18 is provided with openings 50 and 52 whereby bulb receptacles 46 and 48 may extend into the inner portion of first member 18. Bulbs 54 and 56, when mounted in receptacles 46 and 48, are in such a position that light therefrom will be reflected by the inner surfaces of bottom wall 24 and side walls 26.

Light-diffusing member 22 is mounted in covering relation to bulbs 54 and 56 so that both direct and reflected illumination is diffused thereby. Light-diffusing member 22 may comprise any conventional material commonly used for the purpose, such as a thin sheet of translucent plastic. Screws 58 and 60 pass through holes 62 and 64 in light-diffusing member 22, and through the top of holes 36 and 38 in first member 18 and engage the threads in posts 32 and 34, thus securing both first member 18 and light-diffusing member 22 to base member 20. Opening 65 in member 22 fits around circular flange 28, as seen in FIG. 2.

A suitable electric wiring arrangement 66 is provided to form an electrical connection between bulb receptacles 46 and 48 and an appropriate power supply, such as a conventional battery-capacitor circuit, which is not shown, being well known in the photographic lighting art. The apparatus is connected by cord 67 to the power supply which may be mounted on the camera housing in known manner. Likewise, the camera shutter actuating mechanism may serve to close the circuit, thus providing means for synchronizing the time of the exposure with illumination of the object being photographed. Bulbs 54 and 56 are preferably of the incandescent type as opposed to vaporizable filament flash bulbs. A complete description of this type of photographic lighting arrangement may be found in U.S. Patent No. 2,969,721.

In FIG. 2 is seen an optical element 68 comprising a conventional close-up lens held by circular lens mount 70, in accordance with conventional practice. Circular flange 28 on bottom wall 24 is adapted to have releasably mounted thereon lens mount 70. When so mounted, lens 68 is disposed in covering relation to and with its optical axis substantially coaxial with fixed aperture 30 and with optical axis A—A of the camera lens system 12. It is also possible, of course, to construct the apparatus with a permanently mounted close-up lens. One or more spacing members 72 extend outwardly from the camera to points in a plane which is at the focal point of the optical system formed by objective lens system 12 and close-up lens 68. Therefore, if the camera is positioned with the ends of spacing members 72 touching a surface or object to be photographed, the object will be in proper focus. Spacing members 72 preferably comprise substantially rigid rods and may be detachably mounted as in tapped holes 74 and 76 in screws 58 and 60 respectively. Thus, if close-up lens 68 is replaced by another lens with a different focal length, spacing members 72 may be removed from holes 74 and 76 and replaced by spacing members corresponding in length to the focal length of the new optical system.

The apparatus may be mounted on camera 10 in any conventional manner, such as making the diameter of hole 40 equal to or only slightly larger than lens bezel 78 which projects forwardly of lens board 14 of a particular type of camera with which the attachment is intended to be used. In the illustrated embodiment, the attachment is shown mounted on camera 10 by means of a lever 80, lateral movement of which causes pins 82 on each side of the attachment to engage the camera under arm 84. A full disclosure of this type of mounting means may be found in U.S. Application Serial No. 734,925, filed May 13, 1958, by William H. Eburn et al., for "Attaching Device" (now Patent No. 2,995,072, granted August 8, 1961). Other conventional means such as clamps, hooks and frictional engagement may also be used.

Referring now to FIG. 4, there is seen a modification of the previously described apparatus comprising a circular member 86 having a plurality of apertures 88 therethrough. Circular member 86 is rotatably mounted on first member 18 by pin 90. Manual rotation of knob 92, a portion of which extends past external side wall 27, will cause rotation of circular member 86, through an appropriate gear connection 94, and successively bring each of apertures 88 into registration with aperture 30 along the optical axis A—A of the system. Stop means such as pin 96, which resiliently engages depressions 98 on the rear of bottom wall 24 (FIG. 4a) as each aperture 88 comes into registration with aperture 30, are preferably provided. Thus, the operator has a selection of aperture sizes, all smaller than the smallest obtainable with the camera aperture-defining means.

The embodiment of FIGS. 4 and 5 is also provided with means for eliminating glare or gloss from the light reflected through lens system 12 from the object being photographed. Polarizing element 89 is attached in covering relation to at least one of apertures 88. Polarizing element 102, having an axis of extinction oriented substantially at right angles to that of polarizing element 89, is detachably mounted in covering relation to diffusing member 22 by slipping edges of polarizing element 102 under the heads of screws 58 and 60, for example. Thus, light emanating from bulbs 54 and 56 is polarized when passing through polarizing element 102 and remains polarized when reflected from the object being photographed. The center of polarizing element 102 is cut away, as at 104, to enable light reflected from the object to reach aperture 30 without passing through polarizing element 102. After passing through aperture 30 the reflected light passes through polarizing element 89 which absorbs the polarized specular component of the light, transmitting only the diffuse component. Thus, light entering lens system 12 is virtually free of glare.

Since a portion of the diffuse component is also absorbed in the polarizing process, it is normally desirable that the aperture covered by polarizing element 89 be one of the larger of apertures 88 in order to insure having a sufficient quantity of light for proper exposure. In the illustrated embodiment the aperture covered by polarizing element 89 is larger than aperture 30 so that the area of exposure is actually defined by aperture 30. Both polarizing elements 89 and 102 are removable from operative relation with the system, as previously mentioned, so that maximum illumination may enter lens system 12 when there is no objectionable glare produced by the object being photographed.

It is apparent from the foregoing description that the present invention provides means for taking accurate, sharply focused and properly illuminated close-up exposures with greater depth of focus than is obtainable using only the camera aperture-defining means with a conventional close-up lens. The aperture-control means of the camera are supplemented by means for reducing the size of the light-transmitting aperture with respect to the optical lens system in order to increase the depth of field, and means are provided for properly illuminating the object with respect to the smaller aperture. Also provided for selective positioning in operable relation to the optical system are means for essentially eliminating glare from the light reaching the camera. All the above features are provided in a unitary, compact device which is easily attached to and removed from the camera.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An attachment for a photographic camera having an optical lens system, said attachment comprising:
    (a) an opaque member with a plurality of circular apertures of different diameters therethrough;
    (b) means for mounting said opaque member in covering relation to said lens system whereby said apertures are selectively positionable in substantially coaxial alignment with the optical axis of said lens system to form an exposure aperture therefor;
    (c) light-reflecting means at least partially encircling said exposure aperture;
    (d) means for mounting one or more sources of illumination in a position relative to said reflecting means whereby illumination from said sources is reflected by said reflecting means forwardly of said camera;
    (e) means for mounting a close-up lens in covering relation to and with its optical axis substantially coaxial with said exposure aperture;
    (f) a first polarizing element mounted in the largest of said plurality of apertures; and
    (g) a second polarizing element removably mounted on said attachment between said sources of illumination and the field to be photographed by said camera;
    (h) said second polarizing element having an opening therethrough in the vicinity of the point where said optical axis intersects said second polarizing element;
    (i) the axes of extinction of said first and second polarizing elements being substantially perpendicular, whereby the specular component of light emitted from said source of illumination and reflected to said lens system is polarized by said second polarizing element and substantially eliminated by said first polarizing element.

2. An attachment for a photographic camera having an optical lens system, said attachment comprising:
    (a) a first opaque member having bottom and side walls, said bottom wall having a first aperture therethrough;

(b) means for mounting said attachment on said camera whereby at least a portion of said bottom wall is in covering relation to said lens system and said first aperture is aligned substantially coaxially with the optical axis of said lens system;

(c) said side walls extending from said bottom wall forwardly of said camera when said attachment is so mounted thereon, at least the inner portion of said side walls comprising a light-reflecting surface;

(d) means for mounting one or more sources of illumination in a position relative to said light-reflecting surface whereby illumination from said sources will be reflected by said light-reflecting surface forwardly of said camera;

(e) means on said bottom wall for mounting a close-up lens in covering relation to and with its optical axis substantially coaxial with said first aperture;

(f) a second opaque member having a plurality of circular apertures of different diameters therethrough and mounted on said first opaque member for movement relative thereto for selectively positioning any one of said plurality of apertures in registration with said first aperture;

(g) one or more spacing members mounted on said first member and extending therefrom to points on the plane at the desired focus distance from said camera;

(h) a first polarizing element mounted in the largest of said plurality of apertures; and (i) a second polarizing element removably mounted on said attachment between said sources of illumination and the field to be photographed by said camera, said second polarizing element having an opening therethrough in the vicinity of the point where it is intersected by said optical axis, the axes of extinction of said first and second polarizing elements being substantially perpendicular, whereby the specular component of light emitted by said sources of illumination and reflected to said lens system is polarized by said second polarizing element and substantially eliminated by said first polarizing element.

References Cited by the Examiner
UNITED STATES PATENTS

| | | | |
|---|---|---|---|
| 2,006,007 | 6/35 | Zimmer | 95—11.5 X |
| 2,018,963 | 10/35 | Land | 88—65 |
| 2,076,419 | 4/37 | Wiggin | 95—18 |
| 2,537,303 | 1/51 | Cobb | 95—11 |
| 2,584,912 | 2/52 | Palmer | 95—11 |
| 2,590,916 | 4/52 | Back | 95—11 |
| 2,638,039 | 5/53 | Bucky | 95—11.5 |
| 2,760,048 | 8/56 | Schulte | 240—1.3 |

NORTON ANSHER, *Primary Examiner.*

JOHN M. HORAN, *Examiner.*